US012131557B2

(12) United States Patent
Liu et al.

(10) Patent No.: US 12,131,557 B2
(45) Date of Patent: Oct. 29, 2024

(54) END-TO-END PARAMETRIC ROAD LAYOUT PREDICTION WITH CHEAP SUPERVISION

(71) Applicant: NEC Laboratories America, Inc., Princeton, NJ (US)

(72) Inventors: Buyu Liu, Cupertino, CA (US); Bingbing Zhuang, San Jose, CA (US); Manmohan Chandraker, Santa Clara, CA (US)

(73) Assignee: NEC Corporation, Tokyo (JP)

( * ) Notice: Subject to any disclaimer, the term of this patent is extended or adjusted under 35 U.S.C. 154(b) by 445 days.

(21) Appl. No.: 17/521,193

(22) Filed: Nov. 8, 2021

(65) Prior Publication Data

US 2022/0147746 A1 May 12, 2022

Related U.S. Application Data

(60) Provisional application No. 63/111,677, filed on Nov. 10, 2020, provisional application No. 63/113,945, filed on Nov. 15, 2020.

(51) Int. Cl.
*G06T 7/10* (2017.01)
*B60W 10/18* (2012.01)
*B60W 10/20* (2006.01)
*B60W 30/02* (2012.01)
*B60W 30/09* (2012.01)
(Continued)

(52) U.S. Cl.
CPC ........... *G06V 20/588* (2022.01); *B60W 10/18* (2013.01); *B60W 10/20* (2013.01); *B60W 30/02* (2013.01); *B60W 30/09* (2013.01);

*G06F 18/2155* (2023.01); *G06T 7/10* (2017.01); *G06V 30/274* (2022.01); *B60W 2420/403* (2013.01);
(Continued)

(58) Field of Classification Search
None
See application file for complete search history.

(56) References Cited

U.S. PATENT DOCUMENTS

2016/0379064 A1* 12/2016 van Beek ............... G06V 10/56
382/104
2018/0082137 A1* 3/2018 Melvin ..................... G06N 3/08
(Continued)

OTHER PUBLICATIONS

Wang, Ziyan et al. "A Parametric Top-View Representation of Complex Road Scenes", NEC Laboratories America, Dec. 14, 2018 (Year: 2018).*
(Continued)

*Primary Examiner* — Idowu O Osifade
(74) *Attorney, Agent, or Firm* — Joseph Kolodka

(57) ABSTRACT

A computer-implemented method for road layout prediction is provided. The method includes segmenting, by a first processor-based element, an RGB image to output pixel-level semantic segmentation results for the RGB image in a perspective view for both visible and occluded pixels in the perspective view based on contextual clues. The method further includes learning, by a second processor-based element, a mapping from the pixel-level semantic segmentation results for the RGB image in the perspective view to a top view of the RGB image using a road plane assumption. The method also includes generating, by a third processor-based element, an occlusion-aware parametric road layout prediction for road layout related attributes in the top view.

16 Claims, 5 Drawing Sheets

(51) Int. Cl.
*G06F 18/214* (2023.01)
*G06V 20/56* (2022.01)
*G06V 30/262* (2022.01)

(52) U.S. Cl.
CPC ............ *G06T 2207/10024* (2013.01); *G06T 2207/20081* (2013.01); *G06T 2207/30256* (2013.01)

(56) References Cited

U.S. PATENT DOCUMENTS

| | | | |
|---|---|---|---|
| 2019/0251373 A1* | 8/2019 | Lee | G06T 7/11 |
| 2019/0294177 A1* | 9/2019 | Kwon | G06N 3/084 |
| 2020/0050900 A1* | 2/2020 | Schulter | G06N 3/045 |
| 2020/0116499 A1* | 4/2020 | Jung | G06V 20/588 |
| 2020/0202487 A1* | 6/2020 | Viswanathan | G06T 3/18 |
| 2020/0236343 A1* | 7/2020 | Holzer | G06T 3/06 |
| 2020/0331465 A1* | 10/2020 | Herman | G05D 1/0276 |
| 2021/0012147 A1* | 1/2021 | Neser | G06V 20/54 |
| 2021/0201145 A1* | 7/2021 | Pham | G06N 3/08 |
| 2021/0271258 A1* | 9/2021 | Tran | B60R 11/04 |

OTHER PUBLICATIONS

Wang, Ziyan, et al. "A parametric top-view representation of complex road scenes", InProceedings of the IEEE/CVF Conference on Computer Vision and Pattern Recognition. Jun. 2019, pp. 10325-10333.

Liu, Buyu, et al. "Understanding road layout from videos as a whole", InProceedings of the IEEE/CVF Conference on Computer Vision and Pattern Recognition. Jun. 2020, pp. 4414-4423.

* cited by examiner

END-TO-END PARAMETRIC ROAD LAYOUT PREDICTION WITH CHEAP SUPERVISION

RELATED APPLICATION INFORMATION

This application claims priority to U.S. Provisional Patent Application No. 63/111,677, filed on Nov. 10, 2020, and U.S. Provisional Patent Application No. 63/113,945, filed on Nov. 15, 2020, incorporated herein by reference in their entireties.

BACKGROUND

Technical Field

The present invention relates to artificial intelligence and more particularly to end-to-end parametric road layout prediction with cheap supervision.

Description of the Related Art

Understanding road layout in top view with perspective input is very essential for real world applications such as autonomous driving or path planning. Recent work proposes to take an RGB image as input and provide pixel-level semantic predictions in top-view. However, such methods usually require pixel-level annotations, which can be very expensive. Moreover, their representations are not compact and do not have the ability to reason the occlusion relationship. Top-view representations can be more beneficial when occlusion relationships are desired, e.g., two objects cannot occupy the same position in top-view while they can potentially occlude each other in perspective view. Hence, an improved method for understanding road layout in top view is desired.

SUMMARY

According to aspects of the present invention, a computer-implemented method for road layout prediction is provided. The method includes segmenting, by a first processor-based element, an RGB image to output pixel-level semantic segmentation results for the RGB image in a perspective view for both visible and occluded pixels in the perspective view based on contextual clues. The method further includes learning, by a second processor-based element, a mapping from the pixel-level semantic segmentation results for the RGB image in the perspective view to a top view of the RGB image using a road plane assumption. The method also includes generating, by a third processor-based element, an occlusion-aware parametric road layout prediction for road layout related attributes in the top view.

According to other aspects of the present invention, a computer program product for road layout prediction is provided. The computer program product includes a non-transitory computer readable storage medium having program instructions embodied therewith. The program instructions are executable by a computer to cause the computer to perform a method. The method includes segmenting, by a first processor-based element of the computer, an RGB image to output pixel-level semantic segmentation results for the RGB image in a perspective view for both visible and occluded pixels in the perspective view based on contextual clues. The method further includes learning, by a second processor-based element of the computer, a mapping from the pixel-level semantic segmentation results for the RGB image in the perspective view to a top view of the RGB image using a road plane assumption. The method also includes generating, by a third processor-based element of the computer, an occlusion-aware parametric road layout prediction for road layout related attributes in the top view.

According to yet other aspects of the present invention, a computer processing system for road layout prediction is provided. The computer processing system includes a memory device for storing program code. The computer processing system further includes a processor device for running the program code to segment an RGB image to output pixel-level semantic segmentation results for the RGB image in a perspective view for both visible and occluded pixels in the perspective view based on contextual clues. The processor device further runs the program code to learn a mapping from the pixel-level semantic segmentation results for the RGB image in the perspective view to a top view of the RGB image using a road plane assumption. The processor device also runs the program code to generate an occlusion-aware parametric road layout prediction for road layout related attributes in the top view.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Embodiments of the present invention are directed to end-to-end parametric road layout prediction with cheap supervision.

Embodiments of the present invention target end-to-end trainable top view layout estimation with a perspective image as input. There are two major challenges within the problem. First, the traditional method direct RGB method does not perform well on distance related attributes or on occluded regions. Second, existing SOTA methods have strong assumptions such as entire video sequences are given or have strong supervision requirements, e.g. pixel-wise semantic annotation or dense depth supervision. Thus, embodiments of the present invention propose to tackle those two above problems with a novel model that effectively exploits limited human annotations only in parametric form in top view, which is also able to output meaningful intermediate representations such as pixel-level occlusion-aware semantic segmentation in perspective view and semantics in top view.

Embodiments of the present invention propose an end-to-end model that first of all, outputs compact parametric predictions for road layout in top view with a perspective image as input. More importantly, the end-to-end model is able to output pixel-level semantic representations in both perspective view and top-view without corresponding human annotations. In an embodiment, the end-to-end model includes three modules. The first module takes RGB as input and outputs semantic segmentation results in perspective view. The second module inputs the initial perspective semantics and learns to map them to the top-view. Finally, the third module receives the outputs from the second module and provides parametric predictions for road layout related attributes in top-view. The outputs of all three modules are occlusion-aware. To guide the training process, the present invention uses the unitize deep supervision that injects losses not only at the last module but also the first and second modules. Note that deep supervision in accordance with the present invention is "cheap" which means that human annotations are only needed at the last step, or in parametric form in top-view. Experimentally, it takes only seconds to annotate one image. Interestingly, with such cheap supervision in parametric form, the present invention is able to obtain a dense pixel-level supervision signal for module one and module two. Moreover, since the human annotations focus on only road layout, the present invention is even able to automatically recover layout related pixels, namely road, crosswalk, sidewalk or lane boundaries, that are originally occluded by foreground in perspective view without undue effort.

Figure 1:
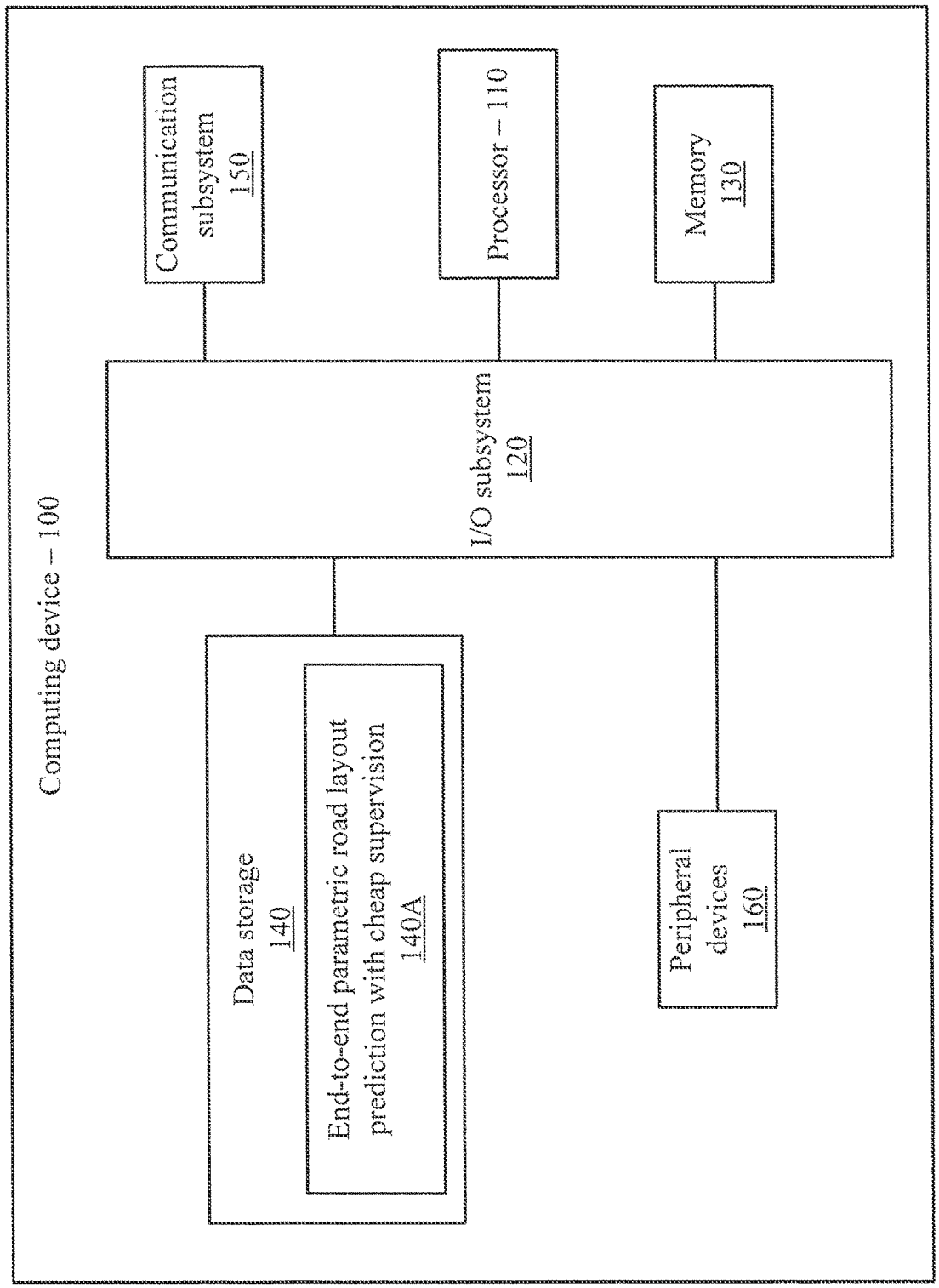
FIG. 1 is a block diagram showing an exemplary computing device, in accordance with an embodiment of the present invention.

FIG. 1 is a block diagram showing an exemplary computing device 100, in accordance with an embodiment of the present invention. The computing device 100 is configured to perform road layout prediction.

The computing device 100 may be embodied as any type of computation or computer device capable of performing the functions described herein, including, without limitation, a computer, a server, a rack based server, a blade server, a workstation, a desktop computer, a laptop computer, a notebook computer, a tablet computer, a mobile computing device, a wearable computing device, a network appliance, a web appliance, a distributed computing system, a processor-based system, and/or a consumer electronic device. Additionally or alternatively, the computing device 100 may be embodied as a one or more compute sleds, memory sleds, or other racks, sleds, computing chassis, or other components of a physically disaggregated computing device. As shown in FIG. 1, the computing device 100 illustratively includes the processor 110, an input/output subsystem 120, a memory 130, a data storage device 140, and a communication subsystem 150, and/or other components and devices commonly found in a server or similar computing device. Of course, the computing device 100 may include other or additional components, such as those commonly found in a server computer (e.g., various input/output devices), in other embodiments. Additionally, in some embodiments, one or more of the illustrative components may be incorporated in, or otherwise form a portion of, another component. For example, the memory 130, or portions thereof, may be incorporated in the processor 110 in some embodiments.

The processor 110 may be embodied as any type of processor capable of performing the functions described herein. The processor 110 may be embodied as a single processor, multiple processors, a Central Processing Unit(s) (CPU(s)), a Graphics Processing Unit(s) (GPU(s)), a single or multi-core processor(s), a digital signal processor(s), a microcontroller(s), or other processor(s) or processing/controlling circuit(s).

The memory 130 may be embodied as any type of volatile or non-volatile memory or data storage capable of performing the functions described herein. In operation, the memory 130 may store various data and software used during operation of the computing device 100, such as operating systems, applications, programs, libraries, and drivers. The memory 130 is communicatively coupled to the processor 110 via the I/O subsystem 120, which may be embodied as circuitry and/or components to facilitate input/output operations with the processor 110, the memory 130, and other components of the computing device 100. For example, the I/O subsystem 120 may be embodied as, or otherwise include, memory controller hubs, input/output control hubs, platform controller hubs, integrated control circuitry, firmware devices, communication links (e.g., point-to-point links, bus links, wires, cables, light guides, printed circuit board traces, etc.) and/or other components and subsystems to facilitate the input/output operations. In some embodiments, the I/O subsystem 120 may form a portion of a system-on-a-chip (SOC) and be incorporated, along with the processor 110, the memory 130, and other components of the computing device 100, on a single integrated circuit chip.

The data storage device 140 may be embodied as any type of device or devices configured for short-term or long-term storage of data such as, for example, memory devices and circuits, memory cards, hard disk drives, solid state drives, or other data storage devices. The data storage device 140 can store program code for road layout prediction. The communication subsystem 150 of the computing device 100 may be embodied as any network interface controller or other communication circuit, device, or collection thereof, capable of enabling communications between the computing device 100 and other remote devices over a network. The communication subsystem 150 may be configured to use any one or more communication technology (e.g., wired or wireless communications) and associated protocols (e.g., Ethernet, InfiniBand®, Bluetooth®, Wi-Fi®, WiMAX, etc.) to affect such communication.

As shown, the computing device 100 may also include one or more peripheral devices 160. The peripheral devices 160 may include any number of additional input/output devices, interface devices, and/or other peripheral devices. For example, in some embodiments, the peripheral devices 160 may include a display, touch screen, graphics circuitry, keyboard, mouse, speaker system, microphone, network interface, and/or other input/output devices, interface devices, and/or peripheral devices.

Of course, the computing device 100 may also include other elements (not shown), as readily contemplated by one of skill in the art, as well as omit certain elements. For example, various other input devices and/or output devices can be included in computing device 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized. These and other variations of the processing system 100 are readily contemplated by one of ordinary skill in the art given the teachings of the present invention provided herein.

As employed herein, the term "hardware processor subsystem" or "hardware processor" can refer to a processor, memory (including RAM, cache(s), and so forth), software (including memory management software) or combinations thereof that cooperate to perform one or more specific tasks. In useful embodiments, the hardware processor subsystem can include one or more data processing elements (e.g., logic circuits, processing circuits, instruction execution devices, etc.). The one or more data processing elements can be included in a central processing unit, a graphics processing unit, and/or a separate processor- or computing element-based controller (e.g., logic gates, etc.). The hardware processor subsystem can include one or more on-board memories (e.g., caches, dedicated memory arrays, read only memory, etc.). In some embodiments, the hardware processor subsystem can include one or more memories that can be on or off board or that can be dedicated for use by the hardware processor subsystem (e.g., ROM, RAM, basic input/output system (BIOS), etc.).

In some embodiments, the hardware processor subsystem can include and execute one or more software elements. The one or more software elements can include an operating system and/or one or more applications and/or specific code to achieve a specified result.

In other embodiments, the hardware processor subsystem can include dedicated, specialized circuitry that performs one or more electronic processing functions to achieve a specified result. Such circuitry can include one or more application-specific integrated circuits (ASICs), FPGAs, and/or PLAs.

Figure 2:
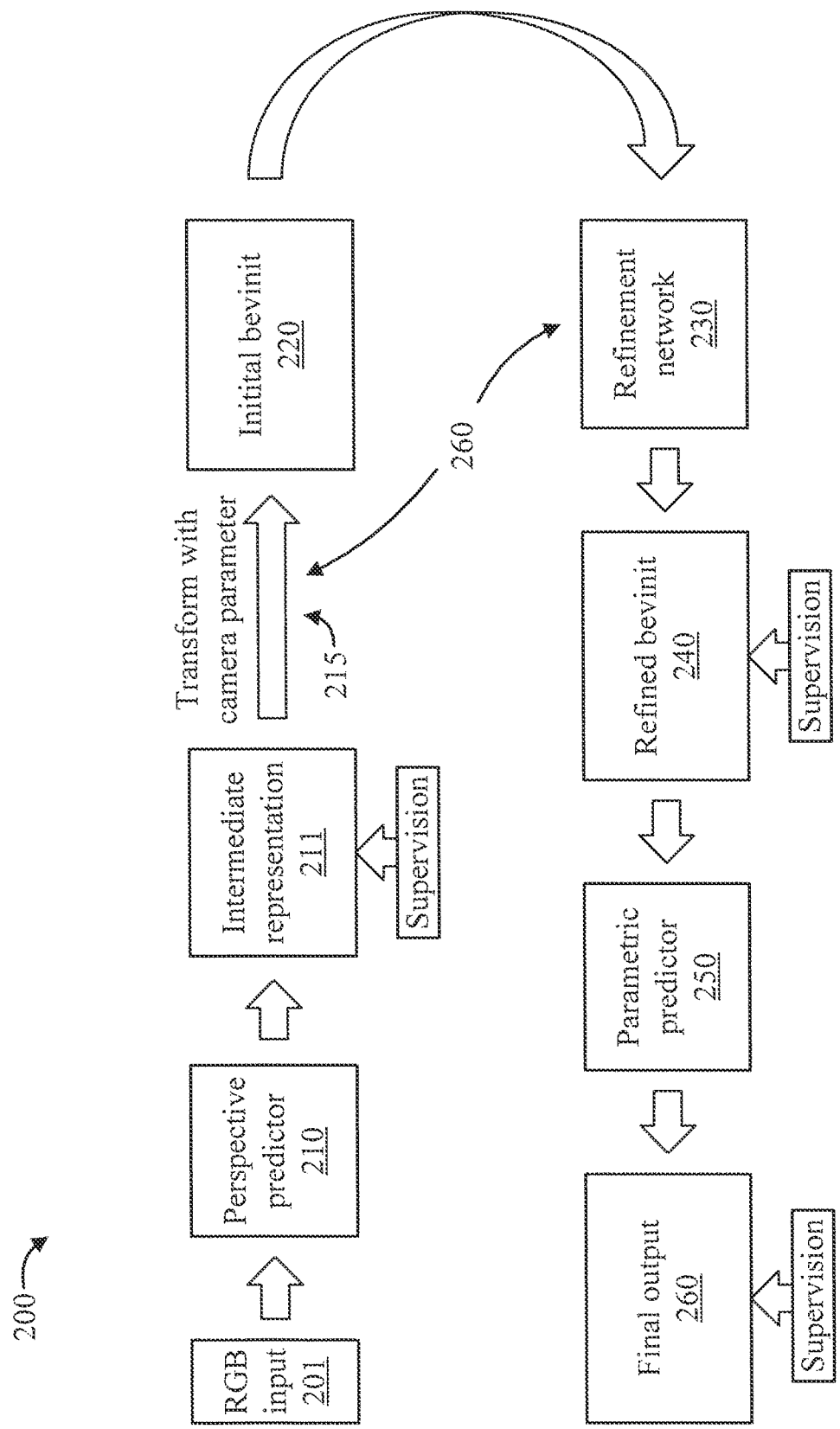
FIG. 2 is a block diagram showing an exemplary end-to-end model, in accordance with an embodiment of the present invention.

These and other variations of a hardware processor subsystem are also contemplated in accordance with embodiments of the present invention FIG. 2 is a block diagram showing an exemplary end-to-end model 200, in accordance with an embodiment of the present invention Basically, the intermediate outputs are 211 and 240. They are where deep supervisions are for. Three modules are 210, 260 (215 and 230) and 250. Among them, 215 and 230 are together for transforming and hallucinating the pixel-level perspective representations to top-view.

Thus, the end-to-end model 200 includes three modules. A first module 210, also referred to herein as a perspective predictor module or perspective module in short, predicts the semantic class of each pixel, including even unseen or occluded regions. A second module 260, formed from modules 215 and 230, also referred to herein as Top-view Semantics (TS) module, learns to map the perspective prediction to the top-view with plane assumption. A refinement module 230 learns to refine the unseen or noisy regions in initial bevinit (birds eye view initialization) obtained with module 220 and outputs refined bevinit 240. A third module 250, also referred to herein as a parametric predictor module or parametric module in short, provides the parametric representation for a generated top-view map (the parametric representation from refined bevinit.). Note that human annotation is only obtained for the third module 250 and the supervisions for the first two modules 210 and 260 are obtained automatically. Compared to existing work, the end-to-end model 200 intellectually utilizes two intermediate representations without labor-intense and ambiguous annotations.

Hence, the present invention proposes an end-to-end model that first of all, outputs compact parametric predictions for road layout in top view with a perspective image as input. More importantly, the end-to-end model in accordance with the present invention is able to output pixel-level semantic representations in both perspective view and top-view without requiring corresponding human requiring human annotations.

As noted above, the end-to-end model 200 includes three modules. The first module 210 takes RGB 201 as input and outputs semantic segmentation results in perspective view. The second module 260 inputs the initial perspective semantics and learns to map the initial perspective semantics to top-view. Finally, the third module 250 receives the outputs from the second module 260 and provides parametric predictions for road layout related attributes in top-view. To guide the training process, the present invention proposes the unitize deep supervision that injects losses not only at the third module 230 but also the first module 210 and second module 260. Note that deep supervision in accordance with the present invention is also cheap which means that human annotation is only required at the last step, or in parametric form in top-view. Experimentally, it takes only seconds to annotate one image. Interestingly, with such cheap supervision in parametric form, the present invention is able to obtain dense pixel-level supervision signals for the first module 210 and the second module 220. Moreover, since the human annotations focus on only road layout, the present invention is even able to automatically recover layout related pixels, namely road, crosswalk, sidewalk or lane boundaries, that are originally occluded by foreground in perspective view with minimal efforts.

Figure 3:
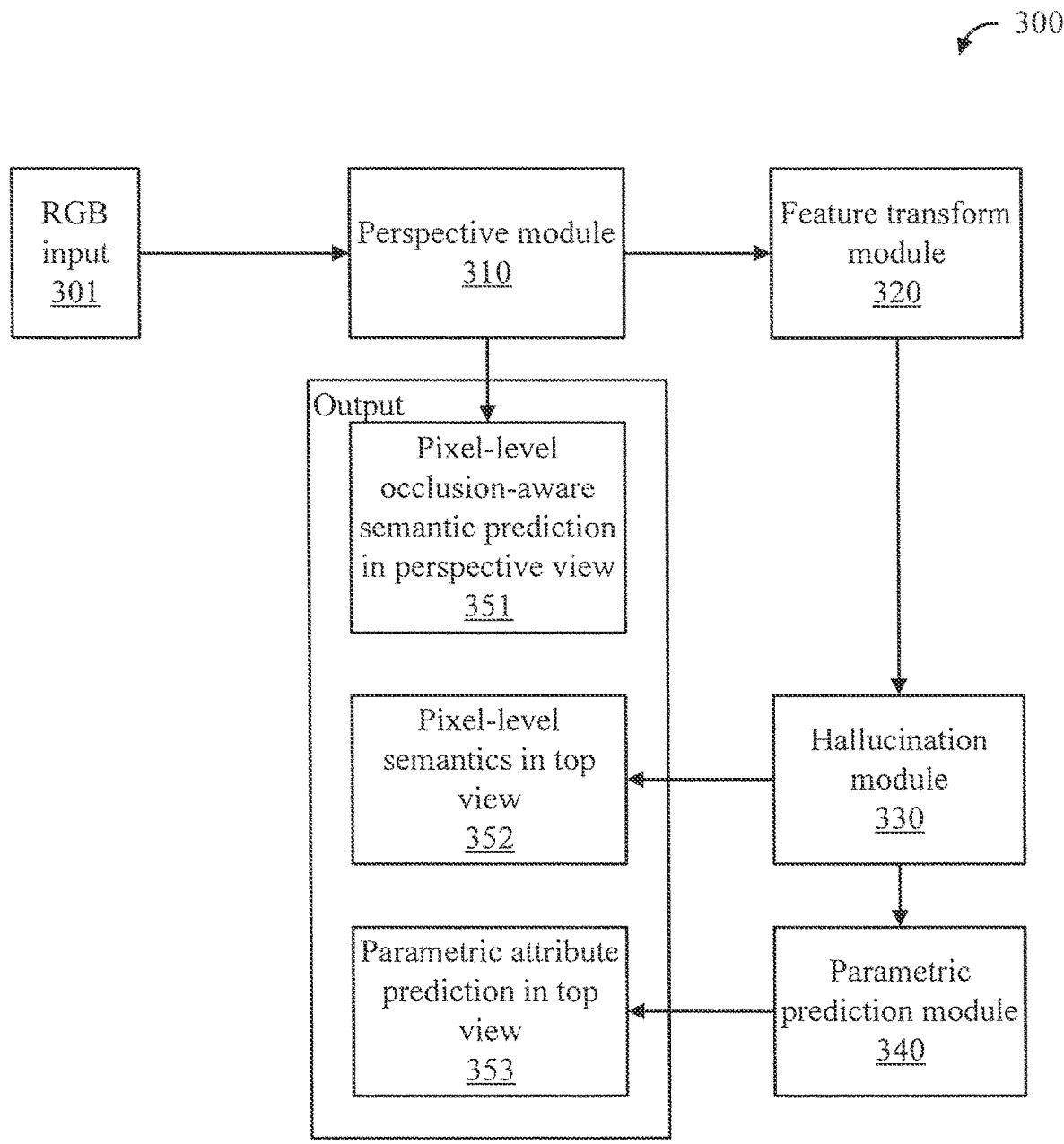
FIG. 3 is a block diagram showing an exemplary system, in accordance with an embodiment of the present invention.

FIG. 3 is a block diagram showing an exemplary system 300, in accordance with an embodiment of the present invention.

The system 300 receives an RGB image 301. The system 300 includes a perspective module 310 (first module), a feature transform module 320 (part of second module), a hallucination module 330 (part of second module), and a parametric prediction module 340 (third module). The feature transform module 320 and the hallucination module 330 form the TD module 220. The system 300 outputs (i) a pixel-level occlusion aware semantic prediction in perspective view 351 from the perspective module 310, (ii) a pixel-level semantics in top view 352 from the hallucination module 330, and (iii) a parametric attribute prediction in top view 353 from the parametric prediction module 340. These elements are described in further detail hereinbelow.

Figure 4:
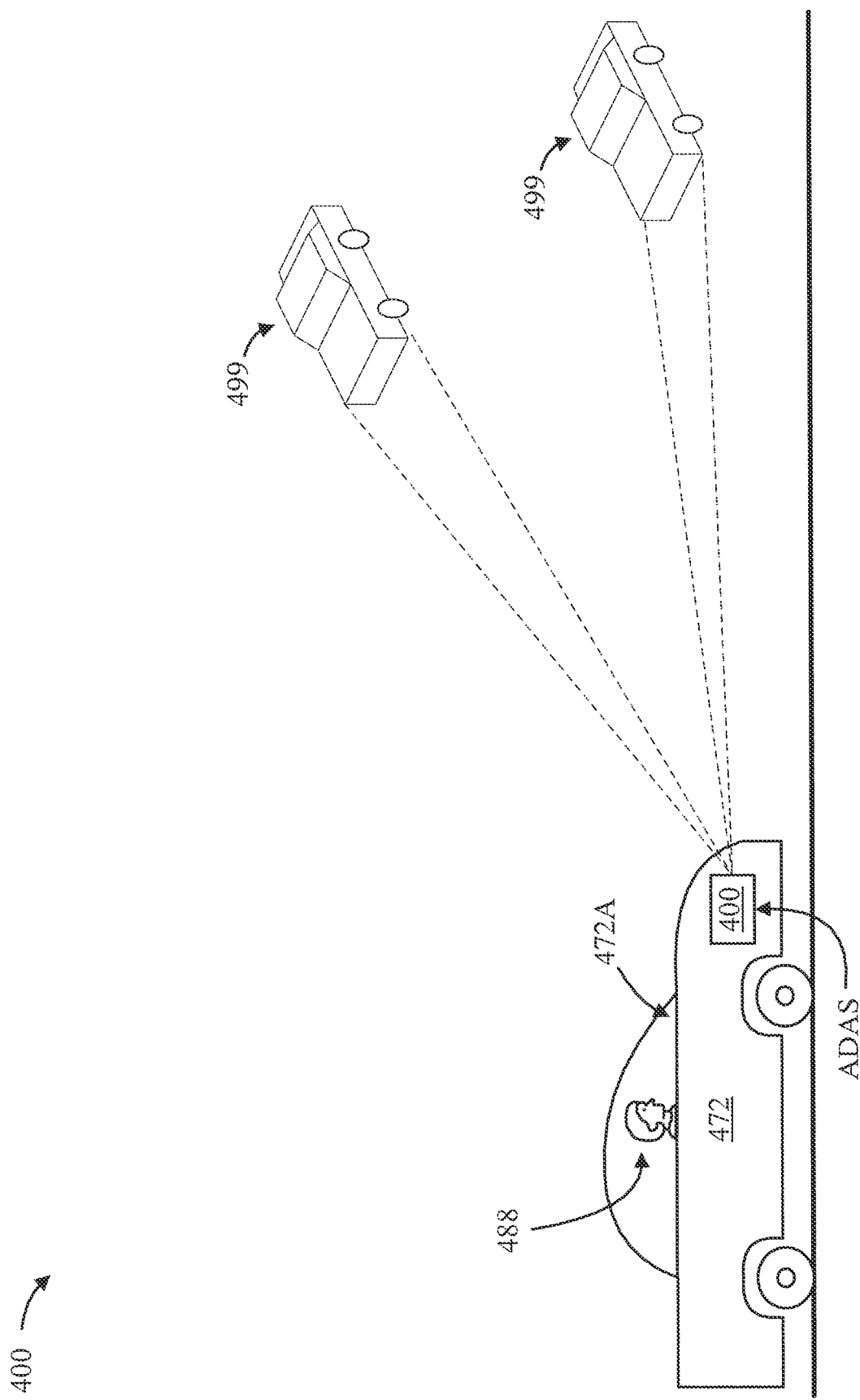
FIG. 4 is a block diagram showing an exemplary environment to which the present invention can be applied, in accordance with an embodiment of the present invention.

FIG. 4 is a block diagram showing an exemplary environment 400 to which the present invention can be applied, in accordance with an embodiment of the present invention.

In the environment 400, a user 488 is located in a scene with multiple objects 799, each having their own locations and trajectories. The user 488 is operating a vehicle 472 (e.g., a car, a truck, a motorcycle, etc.) having an ADAS 477.

The ADAS 477 calculates an occlusion-aware parametric road layout prediction.

Responsive to the occlusion-aware parametric road layout prediction, a vehicle controlling decision is made. To that end, the ADAS 477 can control, as an action corresponding to a decision, for example, but not limited to, steering, braking, and accelerating systems.

Thus, in an ADAS situation, steering, accelerating/braking, friction (or lack of friction), yaw rate, lighting (hazards, high beam flashing, etc.), tire pressure, turn signaling, and more can all be efficiently exploited in an optimized decision in accordance with the present invention.

The system of the present invention (e.g., system 400) may interface with the user through one or more systems of the vehicle 472 that the user is operating. For example, the system of the present invention can provide the user information through a system 472A (e.g., a display system, a speaker system, and/or some other system) of the vehicle 472. Moreover, the system of the present invention (e.g., system 400) may interface with the vehicle 472 itself (e.g., through one or more systems of the vehicle 472 including, but not limited to, a steering system, a braking system, an acceleration system, a steering system, a lighting (turn signals, headlamps) system, etc.) in order to control the vehicle and cause the vehicle 472 to perform one or more actions. In this way, the user or the vehicle 472 itself can navigate around these objects 499 to avoid potential collisions there between. The providing of information and/or the controlling of the vehicle can be considered actions that are determined in accordance with embodiments of the present invention.

Figure 5:
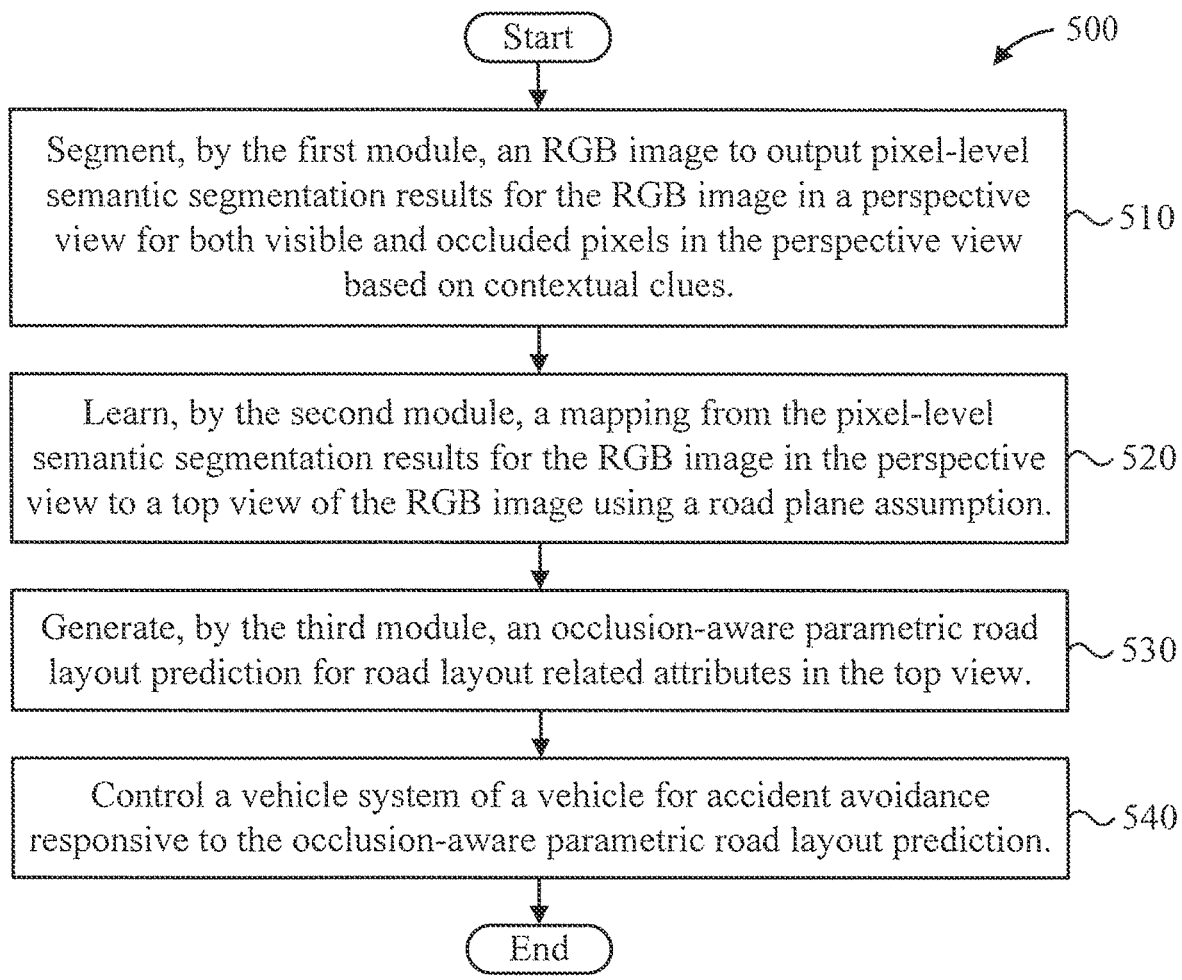
FIG. 5 is a flow diagram showing an exemplary method for road layout prediction, in accordance with an embodiment of the present invention.

FIG. 5 is a flow diagram showing an exemplary method 500 for road layout prediction, in accordance with an embodiment of the present invention.

At block 510, segment, by the first module, an RGB image to output pixel-level semantic segmentation results for the RGB image in a perspective view for both visible and occluded pixels in the perspective view based on contextual clues.

At block 520, learn, by the second module, a mapping from the pixel-level semantic segmentation results for the RGB image in the perspective view to a top view of the RGB image using a road plane assumption. The pixel-level semantic segmentation results are occlusion-reasoned to indicate items occluded in the perspective view of the RGB image. The top view of the RGB image is occlusion-reasoned to indicate items occluded in the perspective view of the RGB image.

At block 530, generate, by the third module, an occlusion-aware parametric road layout prediction for road layout related attributes in the top view. In an embodiment, the occlusion-aware parametric road layout prediction includes a prediction boundary such as, for example, but not limited to, a road boundary, a crosswalk boundary, a sidewalk boundary, a lane boundary, and an object (person, other vehicle, building, etc.) boundary that can be collided with, wherein one or more members of the group are originally occluded by a respective foreground element in the perspective view.

At block 540, control a vehicle system of a vehicle for accident avoidance responsive to the occlusion-aware parametric road layout prediction. The vehicle system can be any one or more of a braking system, an accelerating system, a stability system, a steering system, and so forth.

A description will now be given of the framework of the present invention, in accordance with an embodiment of the present invention.

The model includes three modules. The first Perspective Semantics (PS) module 310 inputs the RGB image and outputs the Occlusion-reasoned pixel-level Semantics in Perspective view (OSP). The second Top-view Semantics (TS) module 330 projects OSP into top-view and learns to hallucinate/complete pixel-level top-view semantics on out-of-view as well as noisy regions, which is referred to as Hallucinated Semantics in Top-view (HST). The last Top-view Parametric Prediction module 340 parses the HST and provides predictions on road layout related attributes in top-view.

A description will now be given regarding a full model, in accordance with an embodiment of the present invention.

Here, the present invention focuses on model structure and assumes that supervisions are available for each module. It is highlighted that the only annotations required are in parametric form. Though it is assumed that dense pixel-level supervision/annotations are available, they are actually from the generation process of the present invention rather than human annotations. Let it first be assumed that there is a data set $D^r = \{I, x^p, x, \Theta\}_{i=1}^{N^r}$ of $N^r$ samples. Specifically, $I \in \mathbb{R}^{H \times W \times 3}$ is the RGB perspective image, where H and W are image height and width. $x^p \in \mathbb{R}^{H \times W \times (C+1)}$ denotes semantic segmentation map in perspective view, with (C+1) semantic categories ("road", "sidewalk", "lane boundaries", "crosswalks" and "foreground"). C denotes the number of background categories and equals to 4 in experiments, although other numbers can be used. The semantic top-views are denoted as $x \in \mathbb{R}^{h \times w \times (C+1)}$, with spatial dimensions h×w, including the same C+1 semantic categories as well. Finally, for each data sample, its corresponding scene attributes are denoted as $\Theta$.

The full model is defined as:

$$\Theta = f^{full}(I) = (f \circ f^{ts} \circ f^{ps})(I),$$

where $\circ$ defines a function composition. $f^{ps}$, $f^{ts}$ and $f$ correspond to three modules.

A description will now be given regarding the perspective semantics module, in accordance with an embodiment of the present invention.

The goal of Perspective Semantics Module 310 is to provide per-pixel occlusion-reasoned semantics in perspective view, or OSP, on the given RGB. Note that compared to traditional semantic segmentation models that predict semantics on visible pixels only, the Perspective Semantics module 310 focuses on predicting both visible and occluded background classes. This requires the module to learn to predict semantics with contextual cues rather than fully relying on visible information.

Assuming that such desired ground-truths, $x^p$, are available in a dataset, the structure of HRNetV2-W18 is followed as a semantic segmentation backbone as it achieves very good trade-offs between accuracy and efficiency. Formally, given an $I \in \mathbb{R}^{H \times W \times 3}$, the PS module would output a $x^p \in \mathbb{R}^{H \times W \times (C+1)}$, which denotes the probability of each pixel belonging to a specific category.

The PS module 310 is defined as follows:

$$x^p = f^{ps}(I)$$

A description will now be given regarding the top-view semantics module 210, in accordance with an embodiment of the present invention.

The second module, i.e., the top-view Semantics module 260, inputs the OSP and learns to explicitly project the semantics in perspective view to top-view. Formally, this module takes the input $x^p \in \mathbb{R}^{H \times W \times (C+1)}$ and outputs $x \in \mathbb{R}^{h \times w \times (C+1)}$. Again, x denotes the probabilistic map in top-view, where h and w are the height and width of top-view map. Given camera parameters, it seems that the projection is trivial if one has the depth estimation available, say, via a depth network. However, there are mainly three problems in this simple solution. First of all, pixel-wise dense depth estimation with single image as input can be inaccurate. With or without ground-truth supervision, depth accuracy can be unsatisfactory on far away regions and boundaries. Furthermore, standard single image depth networks typically do not reason depth in occluded regions, which is nevertheless required for occlusion-aware projection in accordance with the present invention. Second, resolution is low for distant regions and thus may lead to sparser/noisier semantics in top-view. Lastly, top-view semantics on close-by regions can be incomplete due to limited field of view.

In view of these challenges, the present invention first makes use of the prior that the road forms nearly a plane, which facilitates the projection without requiring depth estimation. This step can be considered to be a transformation module. Second, the present invention provides a hallucination module 330 to address the sparser/noisy semantics and incomplete predictions on far-away and close-by regions in top-view.

Specifically, known camera intrinsics and extrinsics with respect to the ground plane are assumed; this is a mild assumption since they could be obtained a prior via calibration in advance. As such, it is well-known that one can compute the homography that maps each pixel in the perspective view to the BEV view and vice-versa. This yields the transformation module.

After the transformation module 320 that maps the OSP to top-view, the hallucination module 330 then learns to predict the unseen far away regions as well as recover the noisy semantics with contextual information in top-view. A shallow version, e.g. 5-layer encoder and decoder, is used as the hallucination module 330. Note that the input and output of hallucination module 330 is of the same size, or h×w× (C+1).

In summary, the TS module is defined as follows:

$$x = f^{ts}(x^p) = (f^{halln} \circ f^{trans})(x^p)$$

where $f^{halln}$ and $f^{trans}$ are the transformation module 320 and hallucination module 330, respectively.

A description will now be given regarding the top view parametric prediction module 340, in accordance with an embodiment of the present invention.

Given the Hallucinated Semantics in Top-view (HST), the next step is to predict the layout attributes. In brief, the Top-view Parametric Prediction (TPP) module 340 maps the HST x into the scene model parameters $\Theta$. The $\Theta$ includes three groups, or $\Theta_b$ for 14 binary, $\Theta_m$ for 2 multi-class and $\Theta_c$ for 10 continuous attributes of scene model, respectively. Binary attributes include information like whether the road is one-way or not. The number of lanes on the left hand-side of the ego car is an example of the multi-class attribute and distance to right side-road can be one of the continuous attributes.

The TTP module 340 is defined as follows:

$$\Theta = f(x) = (h \circ g)(x),$$

where h and g are multi-layer perceptron (MLP) and convolutional neural networks respectively. Specifically, h is implemented as a multi-task network with three separate predictions $n_b$, $n_m$, and $n_c$ for each of the parameter groups $\Theta_b$, $\Theta_m$ and $\Theta_c$ of the scene model.

The TTP module 340 is also able to exploit the simulate data. One can easily extend the current design to a hybrid version that leverages the rich and large set of annotations from simulated data during training.

A description will now be given regarding model training, in accordance with an embodiment of the present invention.

It is assumed that supervisions are all available for each module. A description will be given regarding how to collect such dataset when having the accessibility to human annotations for parametric layout $\Theta$ only. Then, an introduction is made into how to exploit deep supervision during training.

The full loss function L is defined as:

$$\mathcal{L} = \lambda \times L^{tpp} + \gamma \times L^{ts} + \beta \times L^{ps}$$

where $\lambda$, $\gamma$ and $\beta$ are the weights for each module.

A description will now be given regarding loss functions on the top-view Parametric Prediction Module, in accordance with an embodiment of the present invention. Since $\Theta$ and I are already available, the loss function of parametric prediction is defined as follows:

$$\mathcal{L}^{tpp} = \sum_{i=1}^{N^r} BCE(\Theta^r_{b,i}, n^r_{b,i}) + CE(\Theta^r_{m,i}, n^r_{m,i}) + \ell_1(\Theta^r_{c,i}, n^r_{c,i}),$$

where (B)CE is the (binary) cross-entropy loss and $\{\Theta, n\}$, i denotes the i-th sample in the data set. For regression, continuous variables are discretized into 100 bins by convolving a Dirac delta function centered at $\Theta_c$ with a Gaussian of fixed variance. With the help of multi-modal predictions, the model can be easily extended with graphical models.

A description will now be given regarding a top view semantics module, in accordance with an embodiment of the present invention.

Unlike the straight-forward design in parametric space, the second module requires per-pixel supervision in top-view. To this end, it is proposed to exploit a rendering function that generates pixel-wise semantics from parametric annotations. Specifically, for each $\Theta$, a x map is rendered.

A description will now be given regarding loss functions on the top view semantics module.

The loss functions for TS module is defined as follows:

$$\mathcal{L}^{ts} = \sum_{i=1}^{N^r} CE(x_i, \hat{x}_i)$$

where $\hat{x}_i$ and $x_i$ denotes the predictions and the rendered ground-truth of the top-view semantics of i-th sample in $D^r$.

A description will now be given regarding the Perspective Semantics Module, in accordance with an embodiment of the present invention.

As long as the top-view semantics x are obtained, they can be mapped back to perspective view with camera parameters as well as plane assumption. Again, this is achieved by computing the homography between the perspective and BEV views.

A back projection can indeed recover the occluded regions and aligns the semantics well with respect to the input image in perspective view.

A description will now be given regarding loss functions on the Perspective Semantics Module, in accordance with an embodiment of the present invention.

Similarly, the loss function for PS module is as follows:

$$\mathcal{L}^{ps} = \sum_{i=1}^{N^r} CE(x^p_i, \hat{x}^p_i)$$

where $\hat{x}^p_i$ and $x^p_i$ denotes predictions in accordance with the present invention and the back-projected ground-truth of the perspective semantics of i-th sample in $D^r$.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as SMALLTALK, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the present invention and that those skilled in the art may implement various modifications without departing from the scope and spirit of the invention. Those skilled in the art could implement various other feature combinations without departing from the scope and spirit of the invention. Having thus described aspects of the invention, with the details and particularity required by the patent laws, what is claimed and desired protected by Letters Patent is set forth in the appended claims.

What is claimed is:

1. A computer-implemented method for road layout prediction, comprising:
   generating, by performing occlusion-reasoned pixel-level semantic segmentation to an image in a perspective view of a road, segmented results including semantics of both visible and occluded pixels in the perspective view;
   mapping from the segmented results including semantics of both visible and occluded pixels in the perspective view to a top view using a road plane assumption; and
   generating, based on the segmented results mapped to the top view including semantics of both visible and occluded pixels, a parametric prediction for road layout related attributes in the top view.

2. The computer-implemented method of claim 1, wherein the step of the generating of the parametric prediction comprises receiving pixel-level human annotations only for the road layout related attributes in the top view, and wherein the step of the generating of the segmented results and the step of the learning of the mapping are performed without human annotations.

3. The computer-implemented method of claim 1, wherein the step of the generating of the segmented results and the step of the learning of the mapping use pixel-level supervision signals.

4. The computer-implemented method of claim 1, wherein the parametric prediction for the road layout related attributes comprises a prediction boundary selected from a group consisting of a road boundary, a crosswalk boundary, a sidewalk boundary, and a lane boundary, wherein one or more members of the group are originally occluded by a respective foreground element in the perspective view.

5. The computer-implemented method of claim 1, further comprising controlling a vehicle system of a vehicle for accident avoidance responsive to the parametric prediction for the road layout related attributes.

6. The computer-implemented method of claim 5, wherein the vehicle system is selected from a group consisting of a braking system, an accelerating system, a stability system, and a steering system.

7. The computer-implemented method of claim 1, wherein the method is performed by an Advanced Driver Assistance System.

8. The computer-implemented method of claim 1, further comprising recovering noisy semantics in the segmented results mapped to the top view including semantics of both visible and occluded pixels.

9. A computer program product for road layout prediction, the computer program product comprising a non-transitory computer readable storage medium having program instructions embodied therewith, the program instructions executable by a computer to cause the computer to perform a method comprising:
   generating, by performing occlusion-reasoned pixel-level semantic segmentation to an image in a perspective view of a road, segmented results including semantics of both visible and occluded pixels in the perspective view;
   mapping from the segmented results including semantics of both visible and occluded pixels in the perspective view to a top view of using a road plane assumption; and
   generating, based on the segmented results mapped to the top view including semantics of both visible and occluded pixels, a parametric prediction for road layout related attributes in the top view.

10. The computer program product of claim 9, wherein the step of the generating of the parametric prediction comprises receiving pixel-level human annotations only for the road layout related attributes in the top view, and wherein the step of the generating of the segmented results and the step of the learning of the mapping are performed without human annotations.

11. The computer program product of claim 9, wherein the step of the generating of the segmented results and the step of the learning of the mapping use pixel-level supervision signals.

12. The computer program product of claim 9, wherein the parametric prediction for the road layout related attributes comprises a prediction boundary selected from a group consisting of a road boundary, a crosswalk boundary, a sidewalk boundary, and a lane boundary, wherein one or more members of the group are originally occluded by a respective foreground element in the perspective view.

13. The computer program product of claim 9, wherein the method further comprises controlling a vehicle system of a vehicle for accident avoidance responsive to the parametric prediction for the road layout related attributes.

14. The computer program product of claim 13, wherein the vehicle system is selected from a group consisting of a braking system, an accelerating system, a stability system, and a steering system.

15. A computer processing system for road layout prediction, comprising:
   a memory device for storing program code; and
   a processor device for running the program code to:
      generate, by performing occlusion-reasoned pixel-level semantic segmentation to an image in a perspective view of a road, segmented results including semantics of both visible and occluded pixels in the perspective view;

map from the segmented results including semantics of both visible and occluded pixels in the perspective view to a top view using a road plane assumption; and generate, based on the segmented results mapped to the top view including semantics of both visible and occluded pixels, a parametric prediction for road layout related attributes in the top view.

16. The computer-implemented method of claim 8, further comprising generating, from the segmented results in the top view in which the noisy semantics are recovered, an image of the perspective view in which occluded regions are recovered.

* * * * *